(12) United States Patent
Bhongale

(10) Patent No.: US 10,254,438 B2
(45) Date of Patent: Apr. 9, 2019

(54) ADAPTIVE FEEDBACK FOR PHASE ESTIMATION AND ADJUSTMENT

(71) Applicant: Halliburton Energy Services, Inc., Houston, TX (US)

(72) Inventor: Satyan Gopal Bhongale, Cypress, TX (US)

(73) Assignee: HALLIBURTON ENERGY SERVICES, INC, Houston, TX (US)

( * ) Notice: Subject to any disclaimer, the term of this patent is extended or adjusted under 35 U.S.C. 154(b) by 89 days.

(21) Appl. No.: 15/129,786

(22) PCT Filed: May 7, 2014

(86) PCT No.: PCT/US2014/037161
§ 371 (c)(1),
(2) Date: Sep. 27, 2016

(87) PCT Pub. No.: WO2015/171135
PCT Pub. Date: Nov. 12, 2015

(65) Prior Publication Data
US 2017/0146686 A1 May 25, 2017

(51) Int. Cl.
*G01V 8/02* (2006.01)
*G01H 9/00* (2006.01)
(Continued)

(52) U.S. Cl.
CPC ........... *G01V 8/02* (2013.01); *G01D 5/35306* (2013.01); *G01D 5/35338* (2013.01);
(Continued)

(58) Field of Classification Search
CPC ........................................................ G01V 8/02
(Continued)

(56) References Cited

U.S. PATENT DOCUMENTS 4,265,122 A * 5/1981 Cook ................. G01N 29/2418
367/140
6,141,138 A 10/2000 Machida et al.
(Continued)

FOREIGN PATENT DOCUMENTS

WO WO-2005029140 A2 3/2005
WO WO-2015171135 A1 11/2015

OTHER PUBLICATIONS

"International Application Serial No. PCT/US2014/037161, International Search Report dated Feb. 5, 2015", 5 pgs.
(Continued)

*Primary Examiner* — Tarifur Chowdhury
*Assistant Examiner* — Omar Nixon

(57) ABSTRACT

Various embodiments include methods, apparatus, and systems to operate a tool downhole in a well, where the tool has sensing system to determine different properties of downhole structures. Such an apparatus can include a received signal that is input to a beam splitter with 5 a local oscillator signal. The beam splitter outputs light signals to first and second photodetectors that convert the respective signals to electrical signals. The electrical signals are input to differential amplifier that generates an amplitude representative of the phase difference between the two input signals. A feedback path converts that 10 amplitude to a phase adjustment signal that is couple to the local oscillator.

23 Claims, 7 Drawing Sheets

(51) Int. Cl.
*G01D 5/353* (2006.01)
*G01F 1/66* (2006.01)
*G01V 1/22* (2006.01)
*G01V 1/46* (2006.01)

(52) U.S. Cl.
CPC ......... *G01D 5/35361* (2013.01); *G01F 1/661* (2013.01); *G01H 9/004* (2013.01); *G01V 1/226* (2013.01); *G01V 1/46* (2013.01); *G01V 2210/1299* (2013.01); *G01V 2210/1429* (2013.01); *G01V 2210/161* (2013.01)

(58) Field of Classification Search
USPC .......................................................... 356/70
See application file for complete search history.

(56) References Cited

U.S. PATENT DOCUMENTS

| | | | | |
|---|---|---|---|---|
| 9,127,983 | B1* | 9/2015 | Cox | ..................... H04B 10/572 |
| 2007/0291271 | A1* | 12/2007 | Wu | ........................ G01N 21/39 356/437 |
| 2008/0031637 | A1* | 2/2008 | Tomaru | ................ H04B 10/548 398/188 |
| 2008/0085121 | A1* | 4/2008 | Tomaru | .................. H04B 10/85 398/138 |
| 2010/0098438 | A1 | 4/2010 | Prat Goma et al. | |
| 2012/0067118 | A1 | 3/2012 | Hartog et al. | |
| 2013/0126701 | A1* | 5/2013 | Smith | ...................... H03F 3/08 250/206 |
| 2013/0329227 | A1* | 12/2013 | Nakahira | ............ G01N 21/956 356/450 |

OTHER PUBLICATIONS

"International Application Serial No. PCT/US2014/037161, Written Opinion dated Feb. 5, 2015", 11 pgs.

* cited by examiner

ADAPTIVE FEEDBACK FOR PHASE ESTIMATION AND ADJUSTMENT

PRIORITY APPLICATIONS

This application is a U.S. National Stage Filing under 35 U.S.C. § 371 from International Application No. PCT/US2014/037161, filed on May 7, 2014 and published as WO 2015/171135 A1 on Nov. 12, 2015, which application and publication are incorporated herein by reference in their entirety.

BACKGROUND

In drilling wells for oil and gas exploration, understanding the structure and properties of the associated geological formation provides information to aid such exploration. In recent years, optical sensing methods have become quite popular in acquiring such information. Even after the well is drilled, methods based on optical sensing can be used downhole to measure properties of the geological formation, as well as composition of fluid in and in the vicinity of the well bore, for example oil and water. Light can be guided down the wellbore via optical fibers.

Interferometric methods can be used to determine, for example, the composition of fluids down hole. However, these techniques can be limited due to many factors that can degrade the signal-to-noise ratio (SNR) of the received signal. For example, there may be limits on depth that the technique can operate effectively due to a signal loss in optical fibers, limits on signal strength due to an upper limit to which the strength of the signal can be increased without increasing the noise, or limits on the frequency/spatial resolution.

DETAILED DESCRIPTION

Figure 1:
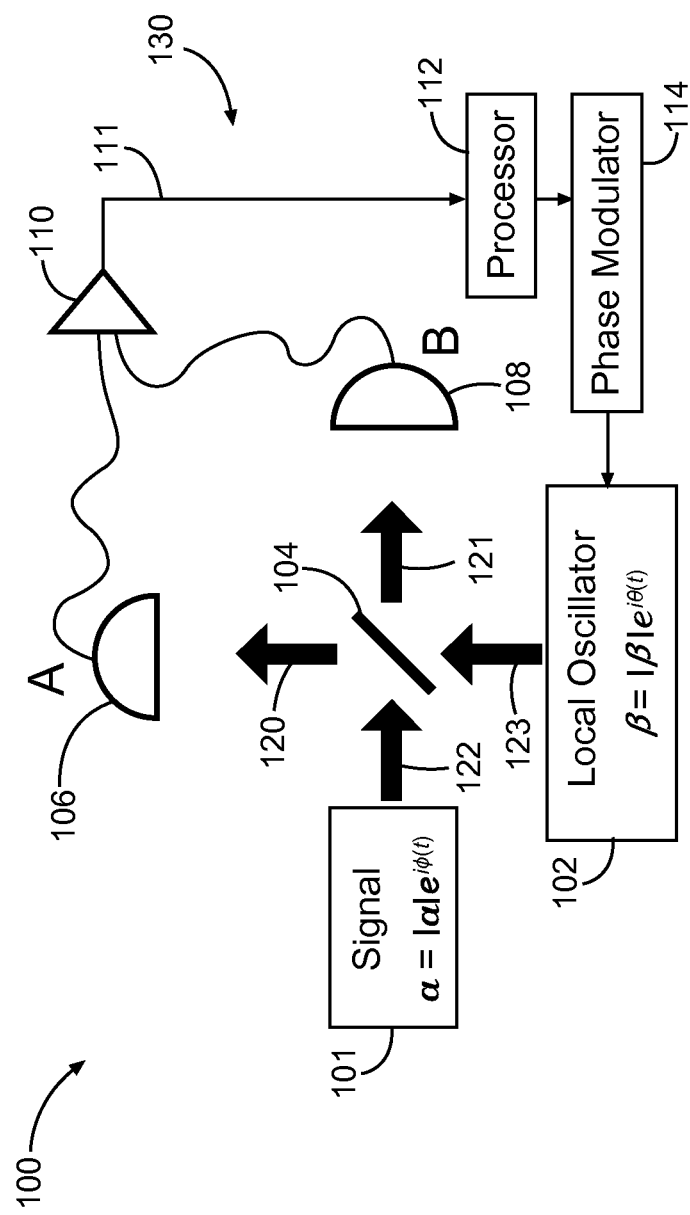
FIG. 1 shows a block diagram of an embodiment of a balanced homodyne detecting apparatus including adaptive feedback.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Properties of a geological formation under investigation may include, among other properties, composition of the formation, fluid composition in the well, fluid composition at the contact with the well bore surface, or the porosity of the formation. The geological formation under investigation can include relative concentrations of different materials associated with a drilling operation. For example, when examining a reservoir section, an interferometric method can provide data with respect to relative concentrations of such materials as sand, a carbonate, and clay in the section. This data can provide information on the quality of the reservoir section, where the quality is based on materials present in the section. The quality analysis can be made with respect to fluids such as oil and water. In addition, data provided by the interferometric method can be used to steer a drilling operation away from a water section or towards an oil section.

Interferometric methods can include fiber optic sensors, point or distributed, that can be based on phase shift of the light pulse as a function of the quantity to be measure (e.g., electric or magnetic fields, acoustic vibrations, gravity, fluid or sand flow). The phase information can typically be extracted via mixing the phase shifted signal with a reference signal. In an interferometric sensor, the interrogation beam and the reference beam can both be derived from the same beam using a beam splitter or optical coupler.

A measurement made from a reference beam in which the reference beam is derived from a local oscillator whose phase is precisely known can be referred to as a dyne measurement. If the local oscillator is resonant with a system field, the measurement can be referred to as homodyne detection. If the local oscillator is detuned from the signal frequency, the measurement can be referred to as heterodyne detection.

Stacking may not be an option in some applications. For example, in measurement application involving LWD (see FIG. 4), the ability to sense fluid properties in real time can be useful. For example, it can be useful to make a measurement on a single copy of the system/signal, the result of which is a sequence of random numbers drawn from the set of $[0, 2\pi]$. Such a constraint can imply a canonical measurement (i.e., a measurement where the errors are limited only by the intrinsic limitations imposed by nature). Reaching an ideal canonical measurement may not be practical. However, using the adaptive feedback technique illustrated in the present embodiments can provide canonical measurements that are closer to ideal than those from simple heterodyne or homodyne mixing.

FIG. 1 illustrates a block diagram of an embodiment of a balanced homodyne detection apparatus 100 that uses adaptive feedback. The apparatus 100 comprises a signal source 101 that could be a point sensor or a distributed sensor that provides a signal 122 whose phase is modified by the downhole property to be measured. For example, this property could be the flow rate or some other property. The beam can originally have been generated by a laser (not shown) or some other monochromatic beam source. The received phase-altered beam can be represented mathematically by $\alpha = |\alpha|e^{i\varnothing(t)}$ where $\varnothing(t)$ is the phase to be estimated.

A local oscillator 102 generates a signal 123 having a known phase that may be different from the phase of the source signal 122 (i.e., first signal). The second signal 123 has the same frequency as the source beam 122. The second signal 123 from the local oscillator 102 can be represented by $\beta = |\beta|e^{i\theta(t)}$ wherein $\theta(t)$ is the known phase.

The first signal 122 from the signal source 101 and the second signal 123 from the local oscillator 102 are input to a 50%-50% beam splitter 104. Mixing is performed by the beam splitter 104 to generate a third signal 120 that is incident on a first photodetector 106 and a fourth signal 121 that is incident on a second photodetector 108. The beam splitter 104 imparts an inherent phase shift between the third signal 120 and the fourth signal 121. Using the 50%-50% beam splitter 104 provides detection that is referred to as balanced homodyne detection. In an embodiment, signals 120-123 are light signals.

The first and second photodetectors 106, 108 detect their respective light signals and generate respective electrical signals in response. The outputs from the first photodetector 106 and the second photodetector 108 are input to a differential amplifier 110 that generates an output signal 111 that can be referred to as a difference photocurrent signal that is proportional to the cosine of the phase difference between the source signal 122 and the second signal 123. The difference photocurrent signal can be represented by the equation $I \propto \cos(\theta(t)-\emptyset(t))$. Thus, phase shift has been converted into an amplitude, I, that is proportional to the difference in phases.

Due to the cosine function, the sensitivity of the difference photocurrent signal can depend on the value of the local oscillator phase θ and is maximum when $(\theta-\emptyset) \to \pi/2$. Thus if the phase of the signal from the local oscillator 102 can be adjusted in response to an estimate of the phase of the received first signal 122, an improved SNR can be achieved. If the estimate of the phase of the received first signal 122 is represented by $\emptyset_{est}$, then the phase adjustment can be represented by $\emptyset_{est}+\pi/2$. Thus a feedback path 130 can be used to provide this adjustment to the local oscillator 102.

The feedback path 130 can include a processor 112 coupled to the output of the differential amplifier 110 and a phase modulator 114 coupled between the processor 112 and the local oscillator 102. This feedback path 130 is for purposes of illustration only as other feedback path elements may be used to accomplish substantially similar results in adjusting the phase of the local oscillator 102 based on the difference photocurrent signal. For example, the feedback path elements of the processor 112 and the phase modulator 114 can be included in a field programmable gate array (FPGA) that performs the subsequently described feedback algorithm. The phase modulator 114 can be any type of modulator (e.g., electro-optical, acoustic-optic) that can produce the same effect on the phase of light.

The processor 112 generates an integrated signal over a scaled time indicative of the phase estimate. If a scaled time is defined by $v=\int_0^t u(s)d$, where u(t) is the envelope of the pulse normalized such that $\int_0^\tau u(t)dt=1$ (where τ is the pulse width), then the feedback algorithm can be stated as follows: the instantaneous photocurrent i(t) is multiplied by a function proportional to $[\sqrt{[\int_0^\tau u(s)ds]}]^{-1}$. The result is integrated and input to the phase modulator 114 that produces a phase shift to the local oscillator. By the end of the time period encompassing the light pulse, the final phase estimation at the end of the pulse is $$\phi_{est}(\tau) = \arg(A + BA);$$

$$A = \exp\left[i\int_0^1 \frac{i(v)}{\sqrt{v}} dv\right];$$

$$B = -\int_0^1 e^{2i(\phi_{est}(v)+\frac{\pi}{2})} dv$$

where "A" and "B" are defined above and are computed by the processor at the end time of the pulse.

Thus, the feedback path 130 elements take the amplitude measurement from the differential amplifier 110 and estimate the phase of the received signal 122. A phase of a signal generated by the local oscillator 102 can then be adjusted to the estimated phase.

Figure 4:
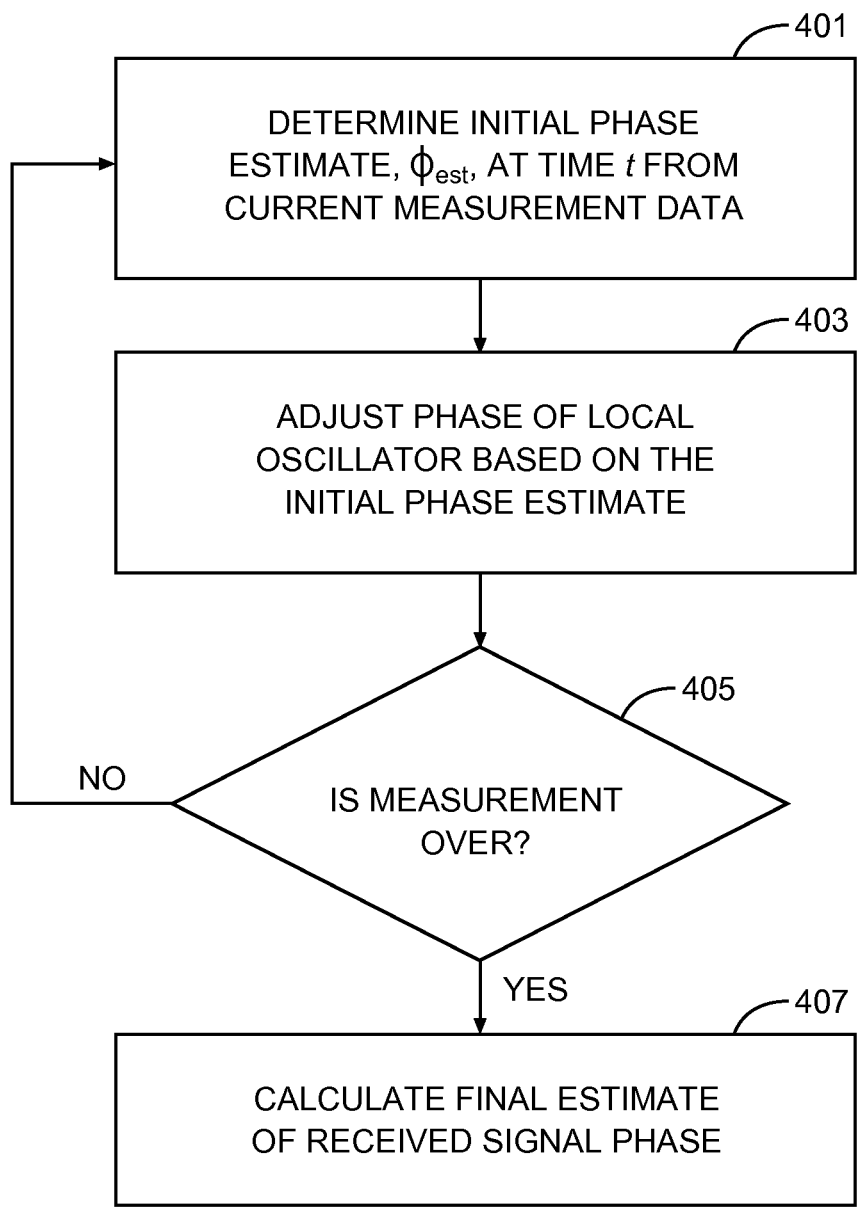
FIG. 4 shows a flowchart of an embodiment of a method for adaptive feedback phase adjustment.

This adaptive feedback phase adjustment method is illustrated in FIG. 4. In block 401, the initial phase estimate at time t, $\emptyset_{est}$, is determined from the current measurement data $\{i(u):0 \leq u \leq t\}$ where i represents the instantaneous photocurrent at time t and u represents the envelope of the light pulse that has been normalized.

In block 403, the local oscillator signal phase, θ, is adjusted according to the initial phase estimate. This can be represented by $\theta \to \theta(t)=\emptyset_{est}(t)+\pi/2$. In block 405, it is determined when the measurement is over. In an embodiment, the measurement is performed during the duration of a light pulse as specified by the received beam. If the measurement is not over, the first two steps 401, 403 are repeated for the duration of the measurement. After the measurement is complete, the best estimate of the received signal phase, Ø, is calculated in block 407 as the final estimate based on the final phase of the local oscillator signal as generated by the local oscillator. This phase can then be used in other processes to determine, for example, the composition and flow rate of the fluid in question that generated the initial received beam.

Figure 2:
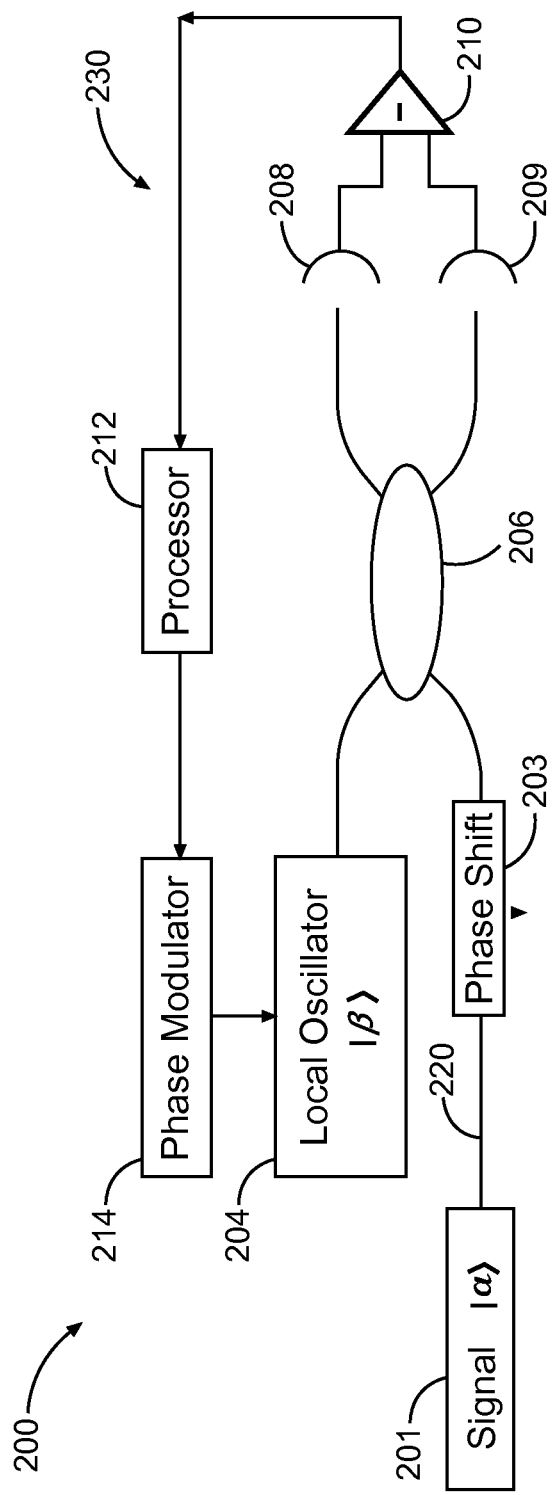
FIG. 2 shows a block diagram of an embodiment of a point sensor system including adaptive feedback.
Figure 3:
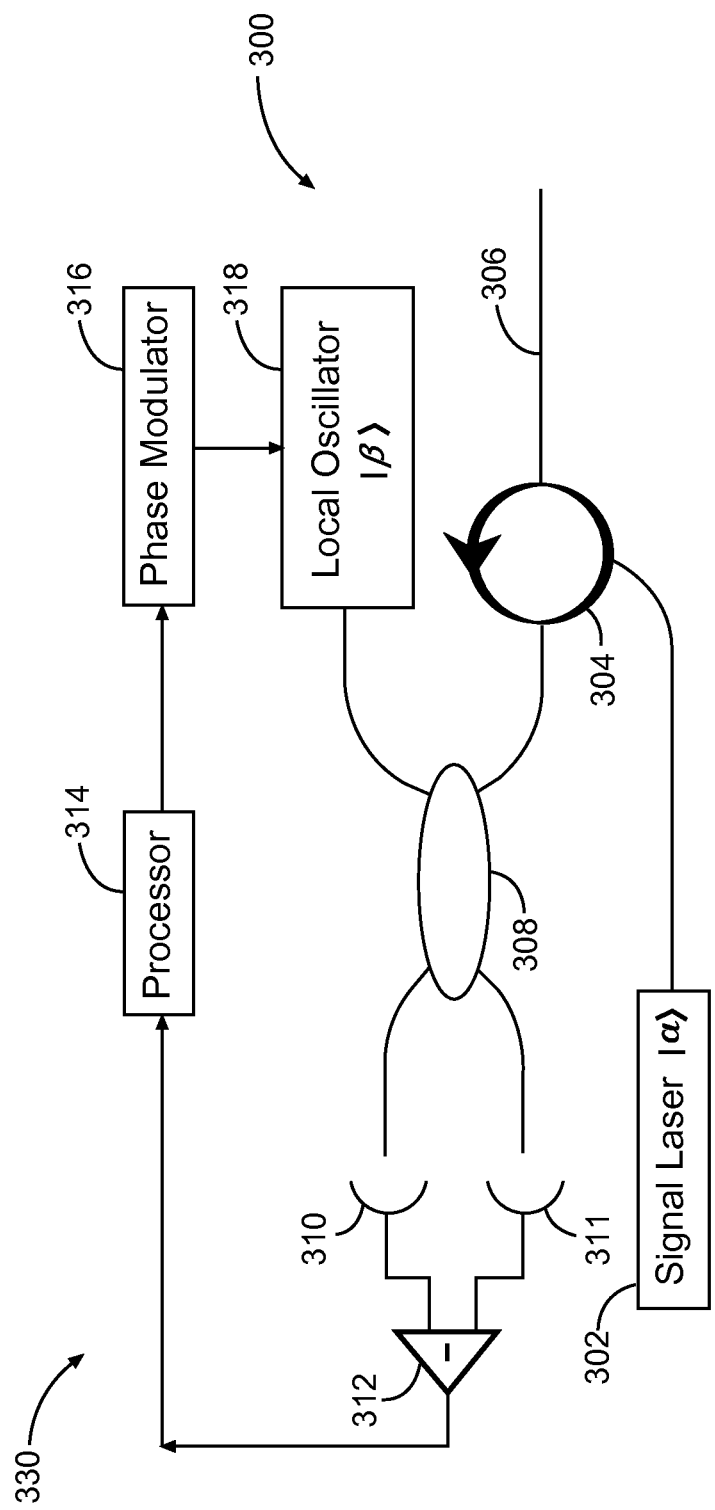
FIG. 3 shows a block diagram of an embodiment of a DAS system including adaptive feedback.

The feedback concept illustrated in FIG. 1 can be used in point sensor applications (see FIG. 2) or distributed sensor applications (see FIG. 3). Other embodiments can use the feedback concept in other applications as well.

In the context of the oil and gas industry, sensing methods based on laser light, both in free space as well as guided via optical fibers, can provide a cost effective, highly sensitive and accurate means to monitor and measure physical quantities of interest. For example, a change in the electric or magnetic fields can produce a strain in an electromagnetic (EM) sensitive material such as nickel or metallic glass alloys (e.g., metglass). If such a material is bonded to an optical fiber, the coherent light pulse passing through the fiber will accrue a phase shift as it passes through the bonded region. Thus, the task of sensing the EM field is converted to measuring the phase shifts of the light. More generally, phase measurements can be used for sensing other quantities/signals such as acoustic waves, gravity gradients, flow rate, presence of certain chemicals, sand content, as well as others. This sensing can be accomplished by coupling the quantity to be measured to the phase of the light passing from where the quantity is to be measured.

FIG. 2 illustrates a block diagram of an embodiment of a point sensor system 200 that can incorporate the feedback concept of the embodiment of FIG. 1. The elements of the system of FIG. 2 are for purposes of illustration only as a point sensor system that incorporates the feedback concept can be accomplished with different elements. The following discussion of the embodiment of FIG. 2 can be read in combination with the above-described embodiment of FIG. 1 to illustrate the mathematical representations of the signals at different parts of the circuit.

The system 200 can include a signal source 201 that provides a light pulse, transmitted, represented by α, over optical path 220 (e.g., optical fiber), to the point sensor 203. The point sensor 203 can pick up the downhole property (e.g., flow rate) to be measured and imprint that on the light as a phase shift. The phase shifted signal is input to a 50%-50% coupler 206.

A local oscillator 204 generates a local light signal having a known phase that may be different from the phase of the source signal. The local signal has the same frequency as the source. The local signal from the local oscillator 204 can be represented by β. The local signal is input to the 50%-50% coupler 206.

The 50%-50% coupler 206 mixes the source signal and the local oscillator signal and outputs two light signals that are detected by the photodetectors 208, 209. The photocurrent signals from the photodetectors 208, 209 are input to a differential amplifier 210 that outputs the difference signal to the feedback path 230.

The feedback path 230 can include a processor 212 coupled to the output of the differential amplifier 210 and a phase modulator 214 coupled between the processor 212 and the local oscillator 204. This feedback path 230 is for purposes of illustration only as other feedback path elements may be used to accomplish substantially similar results in adjusting the phase of the local oscillator 204 based on the difference photocurrent signal. For example, the feedback path elements of the processor 212 and the phase modulator 214 can be included in a field programmable gate array (FPGA) that performs the subsequently described feedback algorithm.

As illustrated in the embodiment of FIG. 1 and discussed previously, the signal from the feedback path 230 can adjust the phase of the local oscillator 204 during the measurement period of the light pulse. The resulting phase estimation can be used to determine, for example, a property of the fluid (e.g., flow rate).

In a DAS, the optical fiber itself acts as a sensor. It operates by taking advantage of Rayleigh backscattering in the fiber. When a light pulse travels through the fiber, light is coherently reflected by points all along the fiber. The time of arrival of the reflected pulse determines the spatial position from where the pulse is back-reflected. The back-reflected light has the same frequency as the transmitted light but different phases. The phase difference between two pulses reflected from two different points in the fiber is related to the acoustic vibration hitting the region of the fiber between those two different backscattering points. The inherent working of the distributed sensing concept allows for having all of the processing units at the source end. Optical delay coils may be used to address specific spatial sections (channels) of the fiber.

The DAS concept can also be used in a point sensing style. A point sensor placed between the two back scattering points can imprint a relative phase on the corresponding backscattered light signals. In this version, the point sensor is measuring, for example, the flow rate of the fluid.

FIG. 3 illustrates a block diagram of an embodiment of a DAS system 300 that can incorporate the feedback concept of the embodiment of FIG. 1. The elements of the system 300 of FIG. 3 are for purposes of illustration only as a DAS system that incorporates the feedback concept can be accomplished with different elements. The following discussion of the embodiment of FIG. 3 can be read in combination with the above-described embodiment of FIG. 1 to illustrate the mathematical representations of the signals at different parts of the circuit.

A signal laser 302 generates a light pulse, represented by α, that is input to a circulator 304. A sensing optical fiber 306 is also coupled to the circulator. The circulator 306 provides the light pulse from the signal laser 302 to the sensing fiber 306. The signal from the signal laser 302 travels in the circulator in the counter-clockwise direction as indicated. When the signal, as phase-adjusted by the downhole fluid property that is sensed (e.g., fluid flow rate, acoustic wave, pressure, etc.) gets reflected back from the sensing fiber 306, the circulator 304 provides the reflected back, phase-adjusted signal to the 50%-50% coupler 308. The path between the circulator 304 and coupler 308 can include delay coils for adjusting the arrival time of the light signal.

A local oscillator 318 generates a local light signal having a known phase that may be different from the phase of the source signal. The local signal has the same frequency as the source that is derived from the originally generated beam from the laser. The local signal from the local oscillator 318 can be represented by β. The local oscillator signal is input to the 50%-50% coupler 308. The path between the local oscillator 318 and coupler 308 can include delay coils for adjusting the path length of the light signal.

The 50%-50% coupler 308 provides two outputs that are detected by the photodetectors 310, 311. The photocurrents from the photodetectors 310, 311 are input to a differential amplifier 312 that outputs the difference signal to the feedback path 330.

The feedback path 330 can include a processor 314 coupled to the output of the differential amplifier 312 and a phase modulator 316 coupled between the processor 314 and the local oscillator 318. This feedback path 330 is for purposes of illustration only as other feedback path elements may be used to accomplish substantially similar results in adjusting the phase of the local oscillator 318 based on the difference photocurrent signal. For example, the feedback path elements of the processor 314 and the phase modulator 316 can be included in a field programmable gate array (FPGA) that performs the subsequently described feedback algorithm. The phase modulator 316 can be any type of modulator (e.g., electro-optical, acoustic-optic) that can produce the same effect on the phase of light.

During a drilling operation, formation fluid can invade the drilling fluid near the drill bit. Near the drill bit, the material of the drilling operation can include drilling fluid with a small portion of formation fluid that is influx into the wellbore with the drilling fluid. An approach to examining this relatively small amount of influx of formation fluid can include subtracting the effect of the drilling fluid itself. The drilling fluid itself, before the trace constituents are added by the drilling action, is essentially the material flowing through the annular pipe not far away from the drill bit. An indication of the drilling fluid composition without this trace constituent can be attained by examining the fluid that is flowing through the inside of the pipe. Thus, examining the fluid flowing through the inside of the pipe versus the fluid with the trace constituents from the formation on the outside of the pipe provides a differential measurement. Making a differential determination of fluid compositions between what is inside and outside the drilling string generates a measurement of the formation fluid (trace constituents) with enhanced resolution. The enhanced resolution results from the large portion of the measurements that is common to the inside and outside being removed from the measurement. The differential measurement can be made during a MWD or LWD process using the above-described embodiments.

Figure 5:
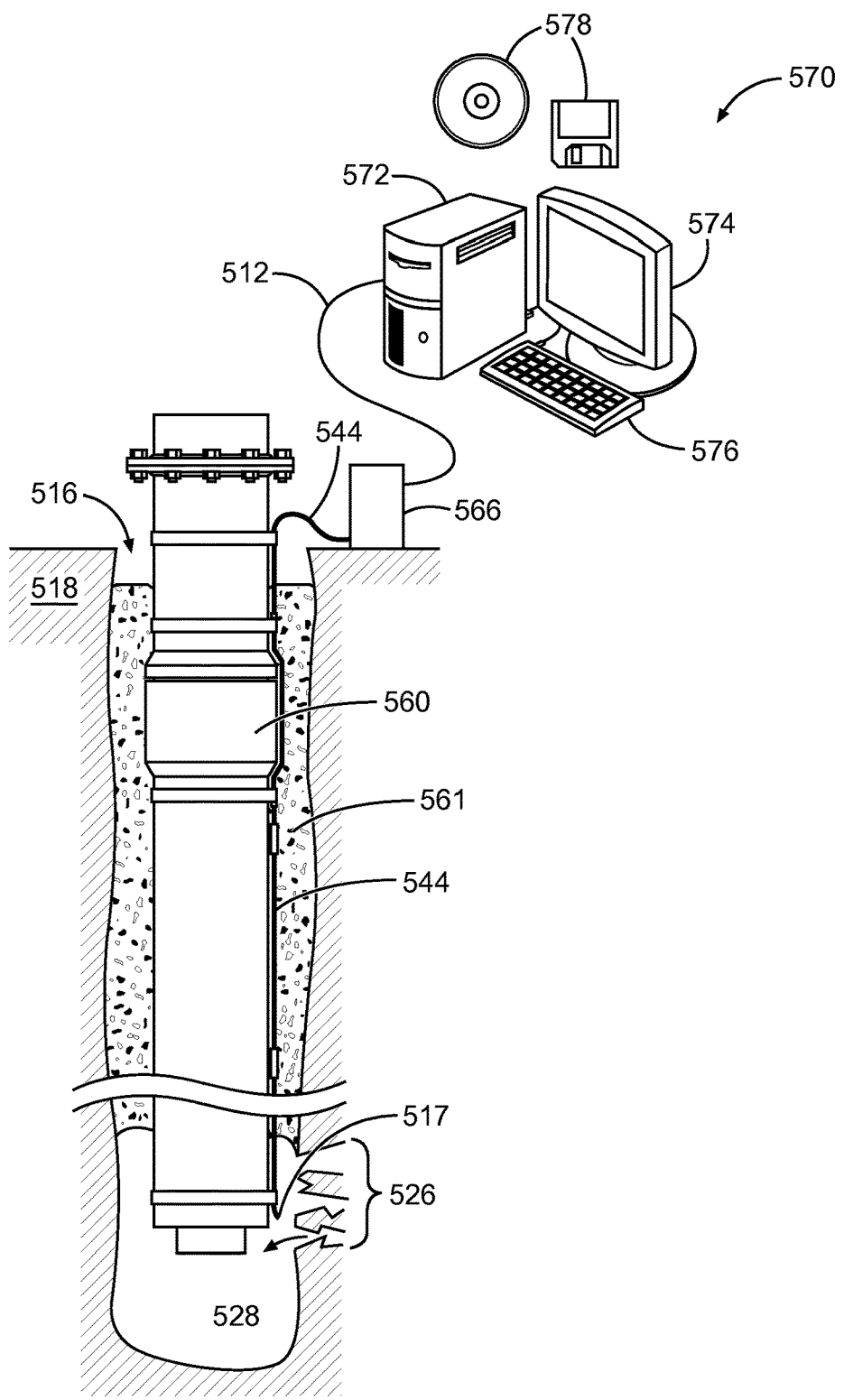
FIG. 5 illustrates an embodiment of a downhole point sensor, in accordance with various embodiments.

FIG. 5 illustrates generally an embodiment of a well system that can be representative of a well to be monitored using a downhole point sensor. A drilling rig has been used to drill and complete the well in a typical manner, such as using a drilling system with a drillstring having MWD or LWD capability and using the balanced homodyne detecting apparatus 100, 200, 300 as shown in FIG. 1, 2, or 3. The illustrative example of FIG. 5 may be used with the method discussed previously with reference to FIG. 4.

The system of FIG. 5 can include a borehole 516 in a geological formation 518. Cement 561 can be surrounding a casing 560 in the borehole 516 to form a production tubing string. The well is adapted to guide a desired fluid (e.g., oil or gas) from a bottom of the borehole to a surface of the earth. Perforations 526 have been formed at a bottom of the borehole 516 to facilitate the flow of a fluid 528 from a surrounding formation into the borehole and thence to the surface via an opening at the bottom of the production tubing string. Note that this well configuration is illustrative and not limiting on the scope of the disclosure.

A fiber optic cable 544 can be placed along an exterior portion of the casing 560 or along the borehole 516. A protective covering may be installed over the fiber optic cable 544 to prevent the cable 544 from being pinched or sheared by the coupling's contact with the borehole wall. The fiber optic cable 544 can be coupled to one or more point sensors 517. The point sensors can measure the property of the fluid that is indicative of, for example, the fluid composition, and translate that into a phase shift of light going through the fiber. The fiber optic cable 544 can be coupled to a signal generator/detector 566 at the surface that can generate a signal to be transmitted downhole.

In at least some embodiments, the fiber optic cable 544 terminates at surface interface with an optical port adapted for coupling the fiber(s) in cable 544 to a light source and a detector in the signal generator. The light source transmits light pulses along the fiber optic cable 544, which contains scattering impurities. As each pulse of light propagates along the fiber, some of the pulse is scattered back along the fiber from every point on the fiber. The optical port communicates the backscattered light to the detector. As discussed previously, the detector in the signal generator/detector 566 can responsively produce electrical measurements of backscattered light phase shift at the point sensor 517 or, in the distributed sensor embodiment of FIG. 6, at each point in the fiber. From the phase shift, the value of the measurement parameter sensed by the fiber at the location of the back-reflection or backscatter is determined.

The signal generator 566 can be controlled by a computer system 570 that is coupled to the signal generator 566 through a control line 512. The computer system 570 can include a CPU 572, a monitor 574, a keyboard 576 as well as computer media (e.g., optical disks, magnetic disks) 578 that can store code representative of the above-described methods. The computer system 570 is adapted to receive the electrical measurement signals produced by the surface signal generator/detector 566 and to responsively determine a distributed parameter such as, e.g., distributed temperature sensing along the length of the casing string, or distributed sensing measurements of acoustic energy, vibrational energy (including active or passive seismic), pressure, strain, deformation, chemical concentrations, nuclear radiation intensity, electromagnetic energy, and/or acceleration (including gravity).

Figure 6:
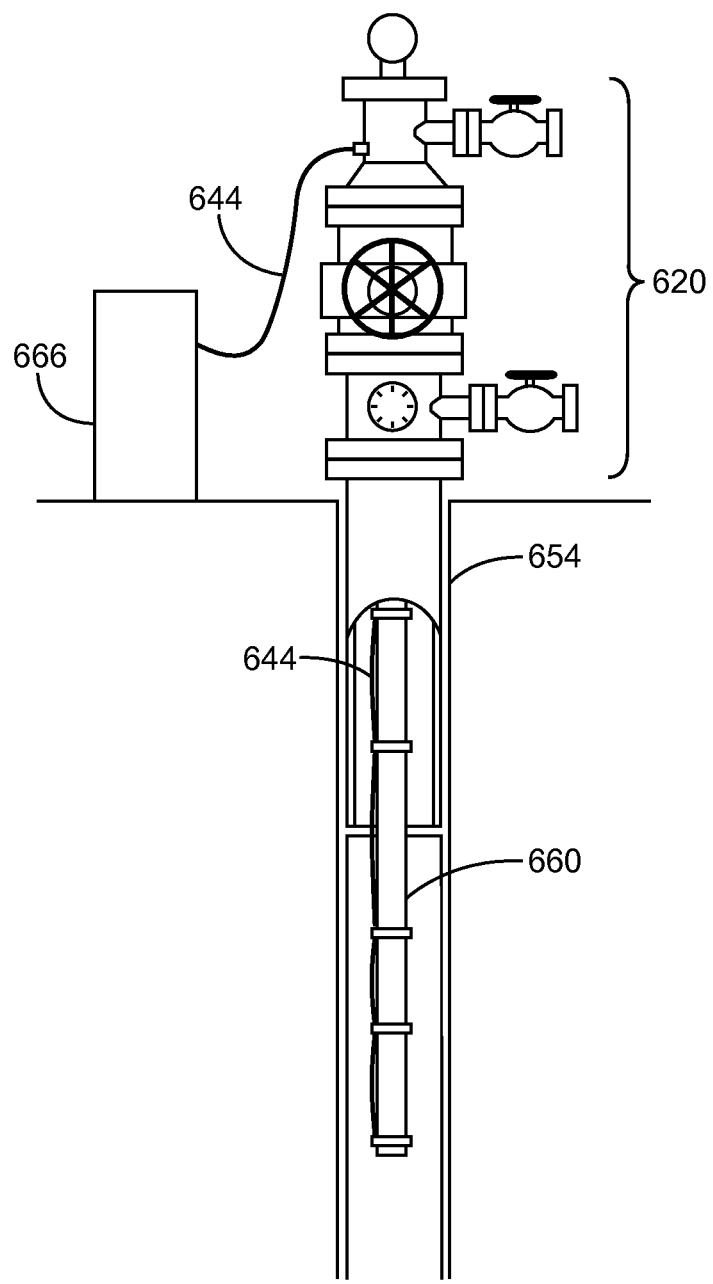
FIG. 6 illustrates an embodiment of a downhole distributed sensor, in accordance with various embodiments.

FIG. 6 illustrates an embodiment of a downhole distributed sensor, in accordance with various embodiments of the adaptive feedback for phase estimation and adjustment. As described previously, the light is reflected back by impurities along the entire length of the fiber. Thus the entire fiber acts as a sensor—a distributed sensor.

The illustrated well system can include a series of valves 620 and other apparatus to cap the well. A casing 654 can be inserted in the borehole. A production tubing 660 or wireline can be inserted in the casing 654. A distributed sensor fiber line 644 can be coupled within the casing, such as attached to the production tubing 660 as shown or attached to the internal portions of the casing. A signal generator/detector 666 can be coupled to the distributed sensor fiber 644 in order to transmit a signal downhole on the fiber 644 as described previously. The signal generator/detector 666 can be self-contained or coupled to a computer system as shown in FIG. 5.

Figure 7:
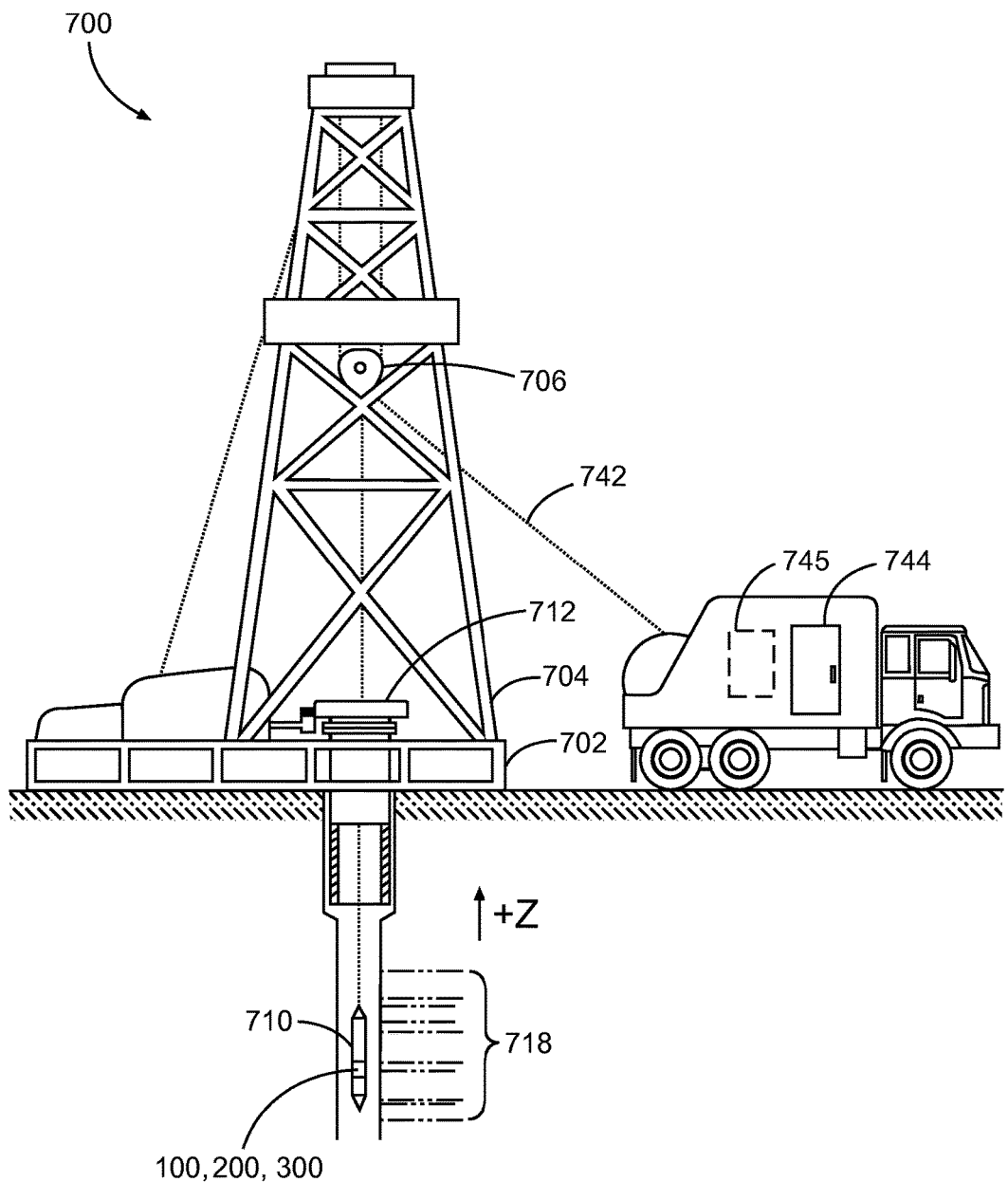
FIG. 7 illustrates an embodiment of a wireline logging system in accordance with various embodiments.

FIG. 7 illustrates generally an example of a wireline logging apparatus. The illustrative example of FIG. 7 may include the electromagnetic formation evaluation tool apparatus 100, 200, 300 such as shown in FIG. 1, 2, or 3 and/or may be used with techniques discussed in relation to FIG. 4. A hoist 706 may be included as a portion of a platform 702, such as coupled to a derrick 704, and used to raise or lower equipment such as a wireline sonde 710 into or out of a borehole. In this wireline example, a cable 742 may provide a communicative coupling between a logging facility 744 (e.g., including a processor circuit 745 or other storage or control circuitry) and the sonde 710. In this manner, information about the formation 718 may be obtained, such as using a laterolog tool included as at least a portion of the sonde 710 as discussed in other examples herein (e.g., a laterolog tool including apparatus 100 and/or systems 200, 300 as in FIG. 1, 2, or 3).

For purposes of illustration, the examples of FIGS. 5, 6, and 7 show a vertically-oriented borehole configuration. However, the apparatus and techniques described herein may also be used in other borehole configurations, such as a borehole including a horizontal penetration direction, or an oblique borehole configuration, for example. The examples of FIGS. 5, 6, and 7 also generally illustrate land-based examples. However, apparatus and techniques described herein may be used in offshore environments as well, such as for subsea operations. In particular, offshore or subsea operations may include use of wireline or LWD/MWD apparatus and techniques including aspects of the examples herein.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method for adaptive feedback phase adjustment during a measurement period, the method comprising:
    generating a first signal with a signal source;
    generating a second signal with a local oscillator;
    receiving a light signal associated with the first signal and the second signal;
    determining a phase estimate of a phase difference between the first signal and the second signal from the received light signal;
    continuing to generate the first signal with the signal source;
    adjusting the phase of the second signal generated by local oscillator in response to the phase estimate to generate an adjusted second signal with the local oscillator;
    receiving an adjusted light signal associated with the first signal and the adjusted second signal;

determining a final estimate of the phase difference between the first signal and the adjusted second signal from the received light signal; and determining, based on the final estimate of the phase difference, a final phase estimate of the first signal.

2. The method of claim 1, wherein the receiving the light signal associated with the first signal and the second signal comprises:

combining the first signal with the second signal at a beam splitter; and generating a third signal and a fourth signal at an output of the beam splitter.

3. The method of claim 2, wherein the receiving the light signal associated with the first signal and the second signal further comprises detecting the third signal and the fourth signal by photodetectors.

4. The method of claim 2, wherein the determining the phase estimate of the phase difference comprises generating a difference photocurrent signal from the third signal and the fourth signal, and wherein the difference photocurrent signal is proportional to a cosine of a phase difference between the first signal and the second signal.

5. The method of claim 4, further comprising converting the phase difference into an amplitude that is related to the phase difference.

6. The method of claim 1, wherein the phase of the first signal is based on a downhole property to be measured.

7. The method of claim 6, wherein the first signal is a pulse of light and the measurement period comprises a duration of the pulse of light.

8. The method of claim 1, further comprising determining a composition of a fluid, an acoustic wave, a gravity gradient, a fluid flow rate, presence of chemicals, or sand content based on the final phase of the first signal.

9. The method of claim 1, wherein the adjusting the phase of the second signal from the local oscillator signal is in response to determining an amplitude representative of the phase difference between a phase of the first signal and the second signal.

10. A method for adaptive feedback phase adjustment, the method comprising:

transmitting a light pulse, having a first frequency, a first phase, and a time period, to a sensor;

generating a local oscillator signal having a local oscillator frequency and a local oscillator phase;

receiving a signal from the sensor, the received signal having a second phase;

determining a difference between the first phase and the local oscillator phase from the received signal;

generating a difference signal in response to the difference between the first phase and the local oscillator phase;

adjusting the local oscillator phase of the generated local oscillator signal, during the time period, based on the difference signal; and determining an estimate of the second phase in response to a final phase of the local oscillator phase at an end of the time period.

11. The method of claim 10, wherein the difference signal is proportional to $\cos(\theta(t)-\emptyset(t))$ wherein $\theta(t)$ is the local oscillator phase and $\emptyset(t)$ is the second phase.

12. The method of claim 10, wherein transmitting the light pulse to the sensor comprises transmitting the light pulse to a point sensor.

13. The method of claim 10, wherein transmitting the light pulse to the sensor comprises transmitting the light pulse to a sensing fiber of a distributed acoustic sensing system.

14. The method of claim 10, further comprising inputting the received signal and the local oscillator signal to a 50%-50% coupler or a 50%-50% beam splitter.

15. The method of claim 10, wherein transmitting the light pulse comprises transmitting the light pulse from a wireline sonde.

16. The method of claim 10, wherein transmitting the light pulse comprises transmitting the light pulse from a drill string during a log while drilling operation.

17. A balanced homodyne detecting apparatus comprising:

a signal source that provides a received signal;

a local oscillator that generates a local oscillator signal having a local oscillator signal phase;

a splitter coupled to the signal source and the local oscillator, the splitter configured to output a first signal and a second signal in response to the received signal and the local oscillator signal, respectively;

a first detector coupled to the splitter and configured to generate a first detector signal in response to the first signal and the local oscillator signal;

a second detector coupled to the splitter and configured to generate a second detector signal in response to the first signal and the local oscillator signal;

a differential amplifier coupled to the first and second detectors and configured to generate a differential signal in response to a difference between the first detector signal and the second detector signal; and a feedback path coupled between the differential amplifier and the local oscillator, the feedback path configured to adjust the local oscillator signal phase of the local oscillator signal generated by the local oscillator in response to the differential signal.

18. The apparatus of claim 17, wherein the feedback path comprises:

a processor coupled to the differential amplifier; and a phase modulator coupled between the processor and the local oscillator and configured to generate a phase shift to the local oscillator in response to an amplitude of a signal from the differential amplifier, wherein the phase modulator is an electro-optical modulator or an acoustic-optic modulator.

19. The apparatus of claim 17, wherein the differential signal comprises an amplitude that is representative of a phase difference between the differential signal and the local oscillator signal, wherein the feedback path is configured to convert the amplitude to a phase difference signal for adjusting the phase of the local oscillator.

20. The apparatus of claim 17, wherein the received signal and the local oscillator signal are light signals and the first and second detectors comprise photo detectors.

21. The apparatus of claim 20, wherein the splitter comprises a 50%-50% beam splitter that imparts an inherent phase difference between the first and second signals, wherein the first and second signals are light signals.

22. The apparatus of claim 17, wherein the apparatus is part of a wireline sonde.

23. The apparatus of claim 17, wherein the apparatus is part of a drill string.

* * * * *